US011228067B2

(12) United States Patent
Yakupov et al.

(10) Patent No.: US 11,228,067 B2
(45) Date of Patent: Jan. 18, 2022

(54) SYSTEM AND METHOD FOR INITIALIZING AND OPERATING METAL-AIR CELL

(71) Applicant: PHINERGY LTD., Lod (IL)

(72) Inventors: Ilya Yakupov, Rehovot (IL); Avraham Yadgar, Kiryat Ono (IL); Aviel Danino, Beit She'an (IL)

(73) Assignee: PHINERGY LTD., Lod (IL)

( * ) Notice: Subject to any disclaimer, the term of this patent is extended or adjusted under 35 U.S.C. 154(b) by 114 days.

(21) Appl. No.: 16/468,775

(22) PCT Filed: Dec. 14, 2017

(86) PCT No.: PCT/IL2017/051347
§ 371 (c)(1),
(2) Date: Jun. 12, 2019

(87) PCT Pub. No.: WO2018/109767
PCT Pub. Date: Jun. 21, 2018

(65) Prior Publication Data
US 2019/0372187 A1    Dec. 5, 2019

Related U.S. Application Data

(60) Provisional application No. 62/434,457, filed on Dec. 15, 2016.

(51) Int. Cl.
*H01M 12/06* (2006.01)
*H01M 4/46* (2006.01)
*H01M 12/08* (2006.01)

(52) U.S. Cl.
CPC ............ *H01M 12/06* (2013.01); *H01M 4/46* (2013.01); *H01M 12/08* (2013.01)

(58) Field of Classification Search
CPC ...... H01M 4/364; H01M 4/525; H01M 4/505; H01M 10/052; C01G 53/04; C01G 53/44; C01G 53/006
See application file for complete search history.

(56) References Cited

U.S. PATENT DOCUMENTS 3,563,803 A    2/1971  Masayoshi et al.
3,850,693 A    11/1974 Kordesch
(Continued)

FOREIGN PATENT DOCUMENTS

CN    1396669    2/2003
CN    101764256  6/2010
(Continued)

OTHER PUBLICATIONS

Egan et al, Developments in electrode materials and electrolytes for aluminium-air batteries, 2013, Journal of Power Sources, vol. 236, pp. 293-310 (Year: 2013).*
(Continued)

*Primary Examiner* — Ula C Ruddock
*Assistant Examiner* — Mary Grace Byram
(74) *Attorney, Agent, or Firm* — Pearl Cohen Zedek Latzer Baratz LLP

(57) ABSTRACT

A method and system for creating low corrosion passivation layer on an anode in a metal-air cell comprise asserting high negative potential and low drawn current density on the cell after its operational parameters have stabilized after the cell has been powered-on. As a result the H2 evolution rate momentarily raises and then drops sharply, thereby causing the creation of a passivation layer on the face of the anode.

10 Claims, 11 Drawing Sheets

(56) References Cited

U.S. PATENT DOCUMENTS

| | | | |
|---|---|---|---|
| 5,004,654 A | 2/1991 | Hunter et al. | |
| 5,049,457 A | 9/1991 | Niksa et al. | |
| 6,387,553 B1* | 5/2002 | Putt | H01M 4/364 |
| | | | 429/3 |
| 10,096,873 B2 | 10/2018 | Yadgar et al. | |
| 2004/0013916 A1 | 1/2004 | Rao et al. | |
| 2010/0283430 A1* | 11/2010 | Chaturvedi | H01M 10/482 |
| | | | 320/134 |
| 2011/0199055 A1* | 8/2011 | Burchardt | H01M 10/48 |
| | | | 320/148 |
| 2013/0034781 A1 | 2/2013 | Khasin | |
| 2014/0017577 A1 | 1/2014 | Minami et al. | |
| 2015/0050568 A1 | 2/2015 | Wang et al. | |
| 2015/0093659 A1 | 4/2015 | Gonzalez et al. | |
| 2015/0171495 A1 | 6/2015 | Yadgar | |

FOREIGN PATENT DOCUMENTS

| | | |
|---|---|---|
| CN | 103022595 | 4/2013 |
| CN | 103545535 | 1/2014 |
| CN | 104332587 | 2/2015 |
| CN | 104393264 | 3/2015 |
| CN | 104538652 | 4/2015 |
| CN | 105144466 | 12/2015 |
| JP | 02168558 | 6/1990 |
| JP | 02295072 | 12/1990 |
| JP | H4-504329 | 7/1992 |
| JP | 2012015025 | 1/2012 |
| JP | 2013247064 | 12/2013 |
| RU | 244493 | 2/2012 |
| RU | 2444093 C1 * | 2/2012 |
| WO | WO 90/11625 | 10/1990 |
| WO | WO 02/071513 | 12/2002 |

OTHER PUBLICATIONS

Machine translation of RU 2444093 C1 from Espacenet originally published on Feb. 2012 to Alekseenko et al, (Year: 2012).*

Li Q et al., "Aluminum as anode for energy storage and conversion: a review", Jul. 20, 2002, Journal of Power Sources, Elsevier SA, CH, vol. 110, No. 1, pp. 1-10.

Egan D R et el., "Developments in electrode materials and electrolytes for aluminium-air batteries", Mar. 15, 2013, Journal of Power Sources, Elsevier SA, CH, vol. 236, pp. 293-310.

Xiong Hanqing et al., "Corrosion and Discharge Behaviors of Al—Mg—Sn—Ga—In in different Solutions", Jun. 14, 2016, Journalof Materials Engineering and Performance, ASM International, Materials Park, OH, US, vol. 25, No. 8, pp. 3456-3464.

Supplementary European Search Report for Application No. EP 17881026 dated Aug. 6, 2020.

International Search Report of Application No. PCT/IL2017/051347 dated Mar. 19, 2018.

Office Action dated Nov. 9, 2021 for corresponding Japanese Application No. 2019-531389.

Office action dated Nov. 16, 2021 for corresponding Chinese patent application No. 2017800809179.

* cited by examiner

SYSTEM AND METHOD FOR INITIALIZING AND OPERATING METAL-AIR CELL

CROSS-REFERENCE TO RELATED APPLICATIONS

This application is a National Phase Application of PCT International Application No. PCT/IL2017/051347, International Filing Date Dec. 14, 2017, entitled "System and Method for Initializing and Operating Metal-Air Cell", published on Jun. 21, 2018 as International Patent Application Publication No. WO 2018/0109767, claiming the benefit of U.S. Provisional Patent Application No. 62/434,457, filed Dec. 15, 2016, which is incorporated herein by reference in its entirety.

BACKGROUND OF THE INVENTION

Several electrolytes have been employed for aluminum-air batteries: aqueous alkaline, aqueous saline, and various organic electrolytes based on ionic salts. Aqueous alkaline electrolytes (which are aqueous solutions of strong alkalis, such as sodium hydroxide or potassium hydroxide, at concentrations ranging 15-45% w/w) are best known for their ability to provide electrical power. This phenomenon stems from a very high rate of aluminum (Al) dissolution within the types of electrolytes mentioned.

Electrochemical dissolution of Al (or an Al alloy) anode in the electrolyte is the chemical driving force providing the production of electricity by the Al-air battery. The overall process for an electrochemical dissolution of an aluminum anode may be presented by the equation as follows:

$$4Al + 3O_2 + 6H_2O \rightarrow 4Al(OH)_3 + 2.71V, \quad \text{(equation 1)}$$

In this process, electrons that are released during the dissolution of the aluminum metal, which creates a flow from the anode to the air cathode, where oxygen reduction occurs. Reaction electrons pass through the external circuit, thus forming the useful electric energy. The theoretical potential for this reaction is rather high (+2.71V), and the high dissolution rate of Al in the aqueous alkaline electrolyte allows high current density (two factors that define power density of the battery).

However, the high chemical potential of Al in aqueous alkaline electrolytes has a drawback. This drawback results in the direct aluminum dissolution of Al in the electrolyte without producing electric current in the external circuit. Opposite to the "useful" process of "electrochemical dissolution", depicted in equation (1), this "parasitic" process may be referred as "chemical dissolution", or "corrosion":

$$2Al + 6H_2O \rightarrow 2Al(OH)_3 + 3H_2 \quad \text{(equation 2)}$$

The process outlined in equation (2) results in waste of the Al "fuel", an undesired consumption of electrolyte, and hydrogen ($H_2$) gas evolution. Ultimately, this is observed as a decrease in efficiency. During operation of the Al-air battery, processes (1) and (2) are in competition with each other. Since there is no other pathway of aluminum consumption in the alkaline Al-air battery besides processes (1) and (2), the competition between electricity production and corrosion can be described by a parameter denoted herein as "coulombic efficiency", which is the ratio of utilized electric current produced by the anode and the sum of utilized electric current and corrosion current. The coulombic efficiency may be also calculated as a ratio of the mass of aluminum dissolved by the electrochemical pathway (equation (1)) to the total mass of aluminum dissolved under the same operating conditions.

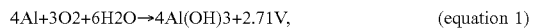

$$C. \text{ Efficiency} = I_{electricity}/(I_{electricity} + I_{corrosion}) = mAl_{electricity}/mAl_{total} \quad \text{(equation 3)}$$

SUMMARY OF THE INVENTION

A method and control system are presented, to create a passivation layer on the surface of an Al anode, that improves the performance of an Al-air battery, namely a higher overall energy density, higher limiting current, higher power density, and lower corrosion, especially at low current and open circuit (OCV) conditions. The named method comprises in the application of a certain combination of operational parameters to the Al-air battery where the anode is made of a low-corrosion anodic alloy, namely Anodic Alloy, and the electrolyte is an aqueous alkaline electrolyte containing a metal oxoanion additive, preferably sodium or potassium stannate, and a specific chemical reaction event between the aluminum anode and metal oxoanion additive, which is accomplished during a certain stage of the battery operation cycle.

In this invention, a method is proposed to create a passivation layer on the surface of an anode, that improves the performance of the Al-air battery, specifically providing a higher overall energy density, higher limiting current, higher power density, and lower corrosion rate, especially at low current and OCV conditions. This method applies a certain combination of operational parameters to an Al-air battery comprising of an anode made of a low-corrosion anodic alloy, such as aluminum alloy composition developed by Arconic Inc., consisting of: less than 3 wt. % Mg, less than 400 ppm Fe, and additions of at least one of: Zn and Ga at an amount ranging from 0.002 wt. % to 0.05 wt. %, the balance being aluminum and unavoidable impurities (herein after Anodic Alloy), and an alkaline electrolyte, containing a metal oxoanion additive, preferably sodium or potassium stannate; thus forming a modified passivation layer.

Corrosion suppression of aluminum anodes in Al-air batteries has been extensively studied for decades. Generally, the considered approaches may be divided into three groups:

(1) Improvement in aluminum anode metallurgy (purity, co-alloying with other metals like Mg, Sn, Ga, In, Zn, production of specific alloy structure, alloy post-production treatment);
(2) Presence of organic anti-corrosion additives and surfactants in the electrolyte;
(3) Presence of inorganic anti-corrosion additives (including oxoanions of metals like Sn, In, Zn, Hg, Pb) in the electrolyte.

The mechanism of action of anti-corrosion additives is believed to be in the modification of the passivation layer. Some chemicals, if present in the proximity of anode surface during the Al anode operation in the battery, may influence (or modify) the properties of the naturally forming oxide/hydroxide layer in such a way, that the competition between the Al metal electrochemical dissolution, and the Al metal's corrosion changes in favor of the first. Hence, electrochemically and chemically forming an anti-corrosion property.

The presence of an anti-corrosion chemical at the reaction surface of the Al anode directly effects the decrease of the corrosion rate under equivalent operating conditions. Thus, resulting in a battery that operates at higher anode columbic efficiency, and produces less $H_2$ under the same operating conditions. Additionally, the overall effect of the additive on the battery operation can be measured on a system level, taking into consideration parameters such as battery energy, power density, and operational cost.

Oxyanion salts of metals, such as Sn, In, Zn, Pb, Ga, Hg (stannate, indate, zincate, gallate, plumbate, mercurate, etc.) are reported to be effective anti-corrosion additives for electrolytes of aluminum-air batteries. The mechanism of action for additives of this type reportedly includes reduction of oxyanion on the surface of the Al anode. Reduction of said oxoanions results in deposition of insoluble (or sparingly soluble) metal particles, which cover the working surface of the anode. Said metal particles modify the properties of the passivation layer on the anode, making the passivation layer less prone to corrosion. This metal-modified passivation layer does not significantly alter the ability of the Al anode to participate in the electrochemical reaction, or effect the production of electric energy in the Al-air battery. The layer of metal particles may be formed on the anode surface as part of a continuous process, counterbalancing the removal of the particles from aluminum surface during the electrochemical dissolution of the aluminum anode.

A method of creating a passivation layer on an Anodic Alloy anode in an Al-air cell is disclosed comprising providing to the Al-air cell electrolyte comprising alkali Oxoanion salt additive at a given concentration, controlling the operational conditions of the Al-air cell to a specific point, that comprises controlling at least two of the parameters: a specific temperature of the electrolyte, a specific negative potential of the anode with respect to the electrolyte and a specific current density drawn from the anode. When the operational condition parameters stabilize decreasing the drawn electrical current density from the Al-air cell to a first low current density thereby causing momentary lowering of the anode potential below a first negative voltage and a momentary raise of evolution rate of $H_2$ from the electrolyte followed, after a first period of time, by sharp drop of the $H_2$ evolution rate and when the level of $H_2$ evolution stabilizes at low values and no later than a second period of time from the time the level of $H_2$ evolution rate lowered, drawing from the Al-air cell operational current.

According to some embodiments the concentration of the alkali Oxoanion salt additive is 0.001-0.1M.

According to some embodiments the alkali Oxoanion salt additive is at least one of stannate, zincate, indate, gallate, plumbate and mercurate.

According to further embodiments the temperature of the electrolyte at stabilized operational conditions before the drawn electrical current density is decreased is less than 50° C. and is between 50° C. and 65° C. during the momentary time of raise of the H2 evolution.

According to some embodiments the anode is made of low-corrosion Al—Mg alloy.

According to some embodiments wherein the anode is made of low-corrosion Al—Mg alloy.

According to some embodiments the negative potential of the anode at the beginning of the decrease of the drawn current density is −1.6V or less with respect to the electrolyte.

According to some embodiments the drawn current density is decreased to current density in the range of −50 to 50 mA/cm$^2$.

According to some embodiments wherein the momentary lowering of the anode potential begins within the first 10% of total expected duration of the Al-air battery operation cycle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
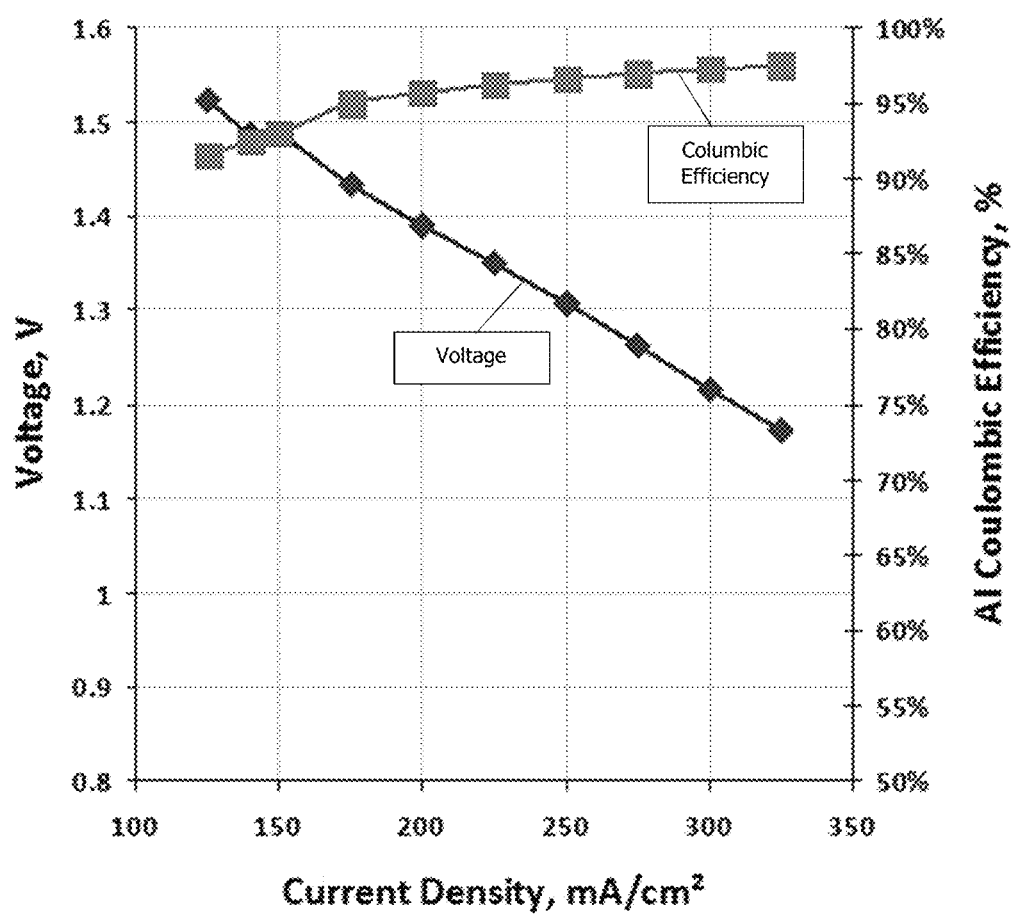
FIG. 1 depicts graph of Al-air battery voltage and coulombic efficiency dependence on the electric current density (measured with an Al-air battery, 400 cm$^2$ of Phinergy Ltd.), according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One of the factors that influence competition between electrochemical dissolution and corrosion on the Al anode surface (processes according to the equations (1) and (2)), which, in other words, establishes the efficiency of anode utilization (equation (3)), is the passivation of the Al anode surface.

In the following detailed description, numerous specific details are set forth in order to provide a thorough understanding of the invention. Certain parameters are known in conventional battery technology by experts within the field. However, this invention shows validity with describing well-known methods, procedures, and components. The terms 'battery', 'cell' and 'electrical cell' are used throughout this invention interchangeably.

Al metal (or Al alloy) in contact with an aqueous alkaline electrolyte undergoes passivation, as a result of a chemical reaction producing a coating layer of metal oxide/hydroxide.

As seen from formulae (1) and (2) both of the Al anode reaction pathways in the battery start from Al metal (or alloy), and finish with aluminum tri-hydroxide. Oxidation of the Al metal (or Al alloy) occurs at the metal/electrolyte interface. The oxidation process may be visualized as a surface penetration of oxygen and hydroxyl species through the depth of the aluminum metal crystal structure. As a result of this process, a metal oxide/hydroxide layer is formed, that protects the underlying metal from continued reaction. This metal oxide/hydroxide layer is called the passivation layer.

Regarding the composition of the passivation layer, a general description may be provided: the deeper part of said passivation layer (closer to the metallic aluminum anode) consists of aluminum oxides of undefined stoichiometry, while the external part (facing the electrolyte) consists mostly of the product of complete aluminum oxidation (and oxide hydration), which can be expressed by the general formula of $Al(OH)_3$, also known as aluminum tri-hydroxide.

With respect to the thickness of the passivation layer, not only formation of the passivation layer (by oxidation) is considered, but the process for removing the passivation layer by dissolution in the electrolyte must be recognized. The dissolution/removal process is important because without it the aluminum anode will quickly passivate, and the battery will cease to operate. However, aluminum tri-hydroxide, which is the major component of the external part of the passivation layer, is readily soluble in an alkali solution. Hence, passivation layer removal process is vital for a continuous Al-air battery operation.

Therefore, the passivation layer on the surface of the Al anode, in the working Al-air battery, may be considered as a dynamic metal-to-electrolyte interface, which is continuously formed and removed during battery operation.

Composition, morphology, and thickness of the passivation layer on the Al anode is an important factor which determines Al battery energy, power, and time-dependent service profile characteristics.

Foremost, the continuously forming passivation layer is the reason why the aluminum anode potential in an alkaline electrolyte, for an Al-air battery, never achieves the theoretical standard value of −2.31 V (vs. NHE)). Instead, a lower potential of −1.8 V to −1.9 V (NHE) is observed in practice.

When current is applied or drawn from a cell, the aluminum anode potential becomes-more positive, primarily due to the potential drop from the passivation layer.

Charge transfer between the Al metal anode and the electrolyte solution is hindered due to the resistance created from the passivation layer. The formation rate and thickness of the passivation layer is a function of anode current density. Furthermore, higher current densities provide a thicker passivation layer, larger electrical resistance, and an overall lower cell potential. Thus, explaining why the Al-air battery typically demonstrates a nominal cell voltage in the range of +1.2 V to +1.4 V compared to the theoretical voltage of +2.71 V.

The phenomenon of the Al anode passivation layer also contributes to current limit in the Al-air battery. As previously mentioned, the formation process of the passivation layer is related to the rate of the aluminum anode undergoing electrochemical oxidation, due to an applied electrical current and a contributing corrosion rate. If the required current and the rate of the Al oxidation exceeds the ability of the electrolyte to dissolve passivation layer, then the Al-air battery anode potential may drop due to too thick of a passivation layer.

With regard to the influence of the passivation layer on the performance of the Al-air battery, the Al passivation layer has demonstrated to affect the coulombic efficiency. The general trend of the dependence between the corrosion rate and electric current is reciprocal. For example, the higher the battery current, the thicker the dynamic passivation layer and the lower the parasitic corrosion rate becomes. FIG. 1 illustrates that coulombic efficiency tends to 100% (nearly zero corrosion) at higher current densities. However, with respect to the overall battery energy and power, this does not mean that higher current densities are preferred due to the decreasing Al anode potential at higher currents (attributed to the increased thickness of the passivation layer). Generally, this negative factor (Al anode potential decrease at a high current density) overwhelms the positive influence of a high current density on the coulombic efficiency. Thus, meaning that the maximum energy and maximum power is not necessarily in the area where coulombic efficiency approaches 100%.

Figure 2:
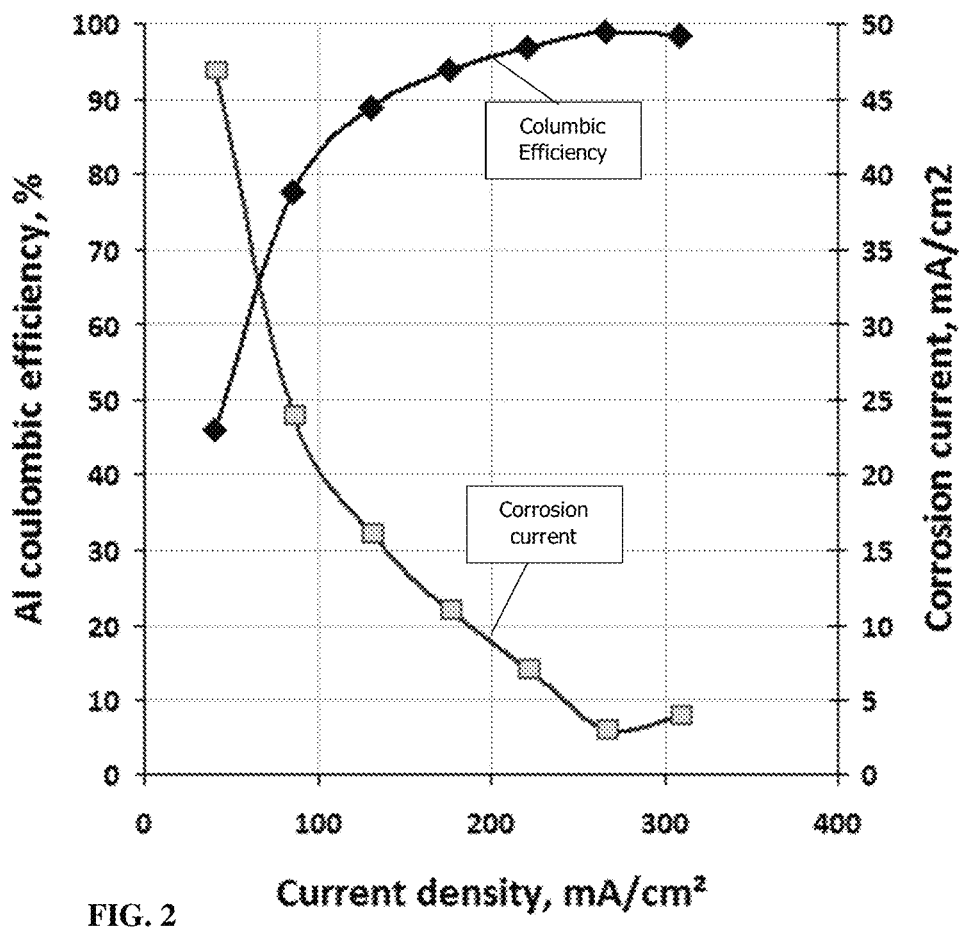
FIG. 2 depicts a graph of Aluminum anode corrosion current (calculation from the $H_2$ gas production rate), and corresponding coulombic efficiency dependence as a function of current density (the Al-air battery, 400 cm$^2$ of FIG. 1), according to embodiments of the present invention.

At lower current densities (towards zero current) the coulombic efficiency naturally decreases because of the decrease in the $I_{electricity}$ factor in the equation (3) and due to the decrease of the passivation layer thickness. Furthermore, due to the passivation layer thickness decrease, the rate of corrosion ($I_{corrosion}$) increases resulting in an increase in $H_2$ production, as demonstrated in FIG. 2. For an Al-air battery with an alkaline electrolyte, anode corrosion and $H_2$ production at low current or open-circuit voltage ($I_{electricity}=0$) is a known problem.

The primary purpose of an Al-air battery is production of electric energy. Therefore, the ultimate criterion, for characterizing the quality and performance of the anodic material for Al-air battery would be the "energy efficiency" that is calculated from coulombic efficiency, multiplied by the ratio of the achievable battery voltage to the theoretical voltage of the reaction of Al electrochemical oxidation in Al-air battery, +2.71 V (see equation (1)).

$$En.\ eff. = C.\ Eff. \times \frac{V}{V_{theor}}, \quad \text{(equation 4)}$$

whereas:
C.eff. —coulombic efficiency;
F—Faraday constant;
V—battery voltage;
$V_{theor}$—theoretical Al-air battery voltage, 2.71V For example, practical battery operating at 90% coulombic efficiency, and at the voltage 1.3V utilizes energetic potential of the aluminum metal by:

$$En.\ eff. = 90\%. \times \frac{1.30\ V}{2.71\ V} = 43\%. \quad \text{(equation 5)}$$

The theoretical amount of electric energy contained in 1 kg of pure aluminum anode working versus air electrode at theoretical voltage +2.71V can be calculated by the following:

$$\frac{1\ kg \times 26.801 \frac{Ah}{eq} \times 3\ \text{electrons}}{26.981 * 10^{-3}\ \frac{kg}{mol}} \times 2.71\ V = 8076 \frac{Wh}{kg}, \quad \text{(equation 6)}$$

whereas:
26.801 Ah/eq—Faraday constant;
26.981*10$^{-3}$—atomic weight of Al;
2.71V—$V_{theor}$ of Al-air battery;
3—moles of electrons transferred for each Al atom oxidized.

By knowing the energy efficiency (by measurement of voltage, current, and hydrogen evolution rate) and the theoretical amount of electrical energy in 1 kg of a pure aluminum anode, an "energy utilization" value for the aluminum anode may be calculated. The energy utilization is defined as the amount of electric energy that is produced per unit weight of the consumed anode material. Continuing from the previous example in equation 5 and 6, the energy utilization would be:

$$\text{Energy utilization} = 8076 \frac{Wh}{kg} \times 43\% = 3487 \frac{Wh}{kg}. \quad \text{(equation 7)}$$

As seen from equations (6) and (7), the energy that a unit weight of anode material may produce in an Al-air battery depends on the corrosion rate (which influences the coulombic efficiency) and the anodic potential that the Al anode develops versus the electrolyte (which affects battery voltage). Both the corrosion rate and electrical potential are largely influenced by the properties of the passivation layer, which persists on the working surface of Al anode.

The inventors of the invention embodiments described in this application have found that if certain Al alloy(s), hereinafter denoted Anodic Alloy, are used as the anode for an aluminum-air battery, and certain combination(s) of battery operation conditions are met (such as electrolyte temperature, current density, and concentration of oxoanion salt additive), then a specific interaction of the anode surface with the electrolyte occurs. An Anodic Alloy may be defined by characteristic value ranges of: Mg in the alloy is in the range of 1-4% wt., Fe in the alloy is in the range of 0-500 ppm, and additions of at least one of: Zn and Ga at an amount in the range of 0.001-0.06 wt. %. As a result of the above battery operation conditions, a modified passivation layer is created, resulting in a performance improvement for the remainder of the battery's operation cycle.

Figure 3:
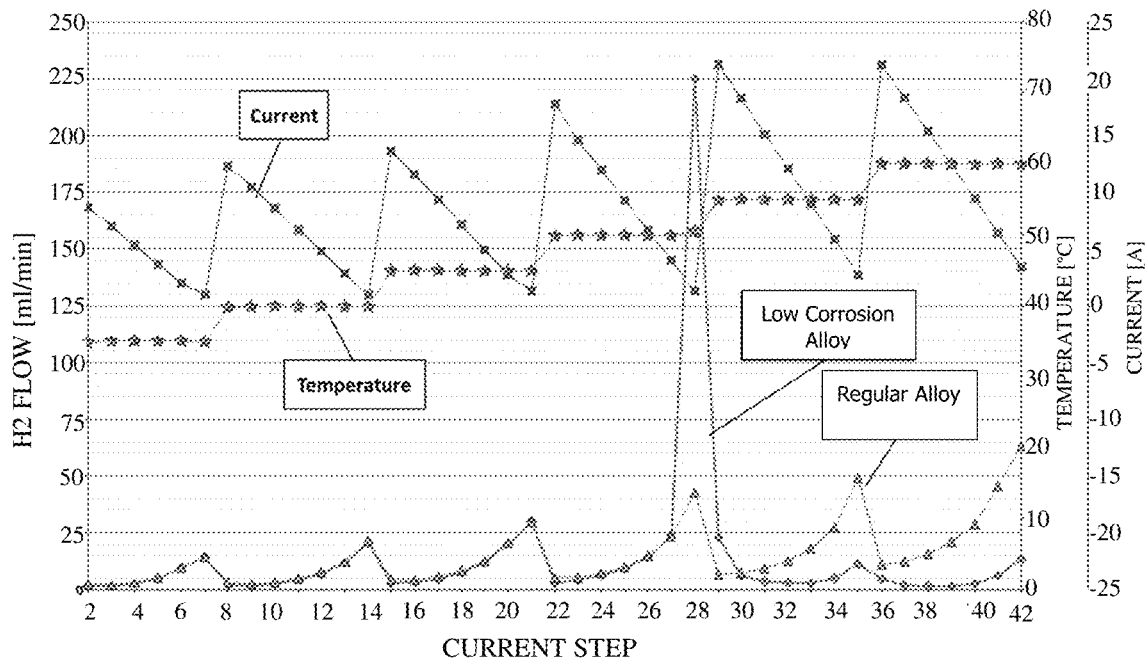
FIG. 3 depicts "peak event" in Anodic Alloy tested in anodic half-cell (aqueous KOH 30% (w/w), sodium stannate 0.004M), according to embodiments of the present invention.

A "peak event" is depicted in FIG. 3. For a Anodic Alloy tested in an anodic half-cell with two different electrolytes: 30% (w/w) KOH electrolyte, and 30% (w/w) KOH with 0.004 M sodium stannate electrolyte. The corrosion rate was measured as a function of H2 evolution. The test profile includes a step-wise increase of the electrolyte temperature with step-wise current densities applied at every temperature step, with a step duration of 45 seconds. Hydrogen evolution was measured at every current step by a $H_2$ flow meter. Each data point generated represents an average hydrogen evolution rate stabilized over a given electrolyte temperature and current.

Notably, at temperatures below 50° C., addition of stannate does not affect corrosion rate of the Anodic Alloy, and the two lines (rhombus and triangle data markers) are very similar. However, at 50° C., at the lowest applied/drawn current, the Anodic Alloy in a stannate-containing electrolyte undergoes an "event", which appears as a "peak"-like hydrogen evolution (rhombus point at Current Step #28). After this "event" is completed, the corrosion rate of the specimen in the stannate-containing electrolyte decreases. Furthermore, when the stannate-containing electrolyte sample is compared to a specimen in an additive-free electrolyte system, the corrosion rate, i.e. $H_2$ production, is also reduced (rhomb points starting from Current Step #31).

The phenomenon that is illustrated in FIG. 3 will be referred to as a "peak event". The application and influence of this phenomenon on Al anode performance in Al-air battery will be further disclosed.

Within the Al-air battery, it was observed that applying a certain combination of operational parameters, while using a Anodic Alloy as an anode material, and electrolyte containing an alkaline metal oxoanion salt additive (such as e.g. stannate of Na or K), will force an interaction resulting in a desired modified passivation layer on the anode surface, denoted herein forth "modified passivation layer". Controlling a working point of the operational conditions (that involves controlling at least two of the electrolyte temperature, the anode potential with respect to the electrolyte and the current density from the anode) of the battery to elevate the electrolyte temperature and/or anode negative potential exceeding a certain level initiates the reaction between the anode and electrolyte. This reaction may be observed as a vigorous reaction on the surface of the anode, accompanied by quick increase of corrosion (measured, e.g., by H2 evolution rate). The corrosion/hydrogen evolution rate increases, reaches maximum, decreases, and eventually stabilizes at a new, substantially lower level.

After this specific interaction occurs, the Al anode gains a modified passivation layer creating a different Al anode surface morphology and contains contrasting properties versus the properties it had prior to the modification or the properties it has if no modification has been applied.

The newly created passivation dramatically improves the energy and power properties of the anode and reduces corrosion rate.

Corrosion reduction is prominent at low current densities, near and/or at open-circuit conditions, which has a considerable impact on the Al-air battery application by enabling a wider range of battery operation conditions, while keeping the utilization of the Al anode at an acceptable level.

Figure 4:
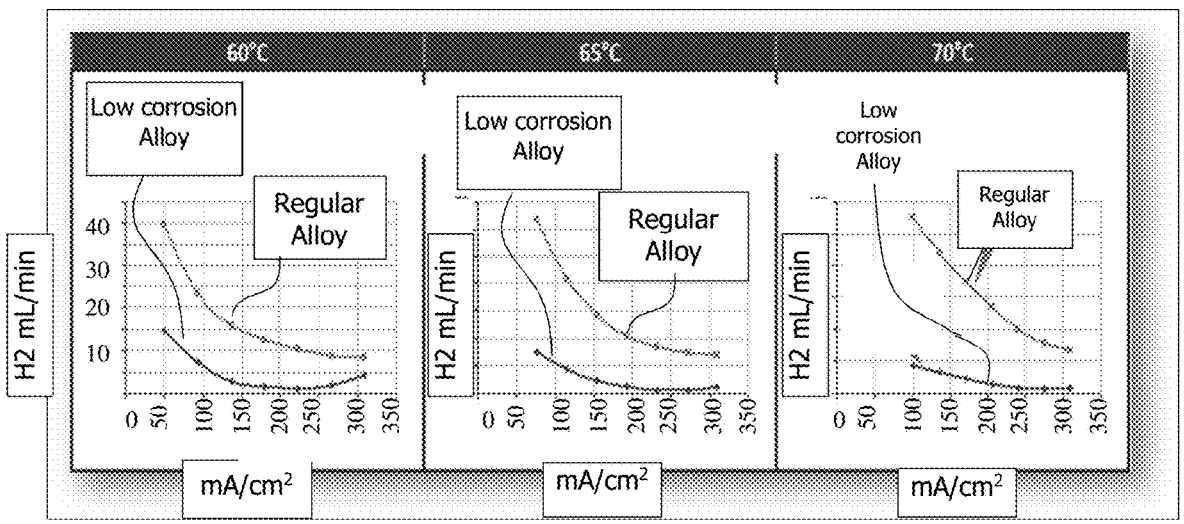
FIG. 4 depicts comparison of corrosion (as H2 evolution rate) at different values of current density and temperature in Anodic Alloy passivated according to the method of this invention versus regular 99.99% Al—Mg alloy in the same electrolyte (KOH 30% (w/w), 0.004M sodium stannate) and same conditions, according to embodiments of the present invention.
Figure 5:
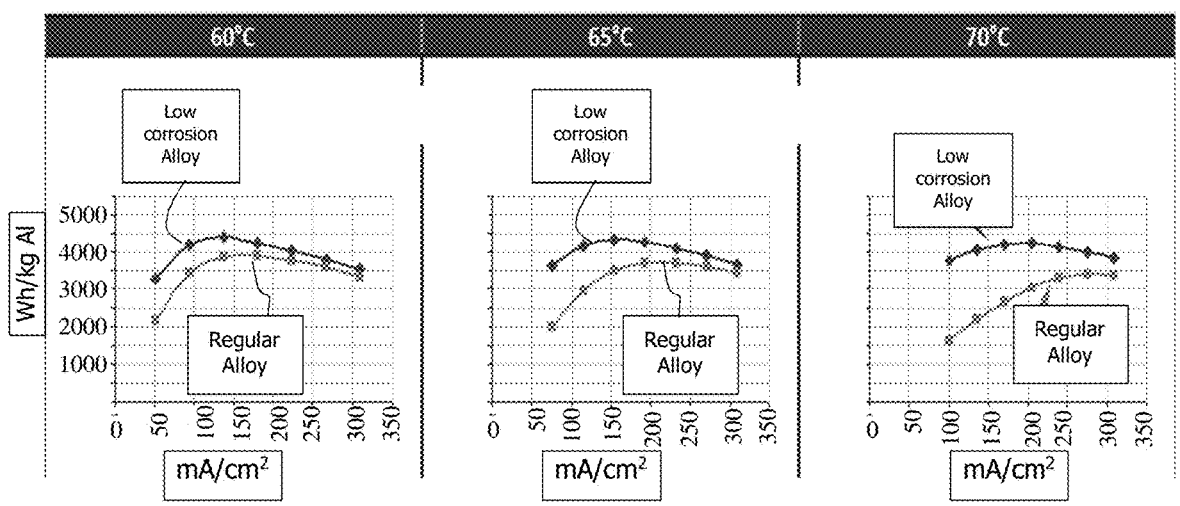
FIG. 5 depicts Aluminum anode energy at different values of current density and temperature in Anodic Alloy passivated according to the method of this invention versus 99.99% Al—Mg alloy in the same electrolyte (KOH 30% (w/w), sodium stannate) and same conditions, according to embodiments of the present invention.

FIG. 4 and FIG. 5 present, respectively, the hydrogen evolution rate and the aluminum anode energy of different specimen of anodes. The anode samples consist of the Anodic Alloy and a "regular" alloy however, the Anodic Alloy differs from the "regular" alloy in the content of at least Ga or Zn. Both alloys are Al—Mg (2.5% Mg), of the same purity level 99.99%. Electrolyte composition were 30%(w/w) KOH electrolyte with 0.004 M addition of sodium stannate at temperatures of 60° C., 65° C. and 70° C.. Performance of both alloys is expected to be similar due to their similar compositions. However, after the Anodic Alloy specimen was subjected to a "peak event", performance substantially improved compared to the "regular" alloy. The "regular" alloy shows no susceptibility to the modified passivation at the same conditions. One can see that the passivated Anodic Alloy demonstrates a decreased corrosion rate under identical conditions, yielding a higher energy utilization.

According to embodiments of the present invention, in order to achieve the improvements previously described in the Al-air battery performance, the following three conditions should be met:
(1) an anode consisting of a low-corrosion Al alloy (preferably Anodic Alloy);
(2) an alkaline electrolyte containing 0.001-0.1M of dissolved metal oxoanion salt additive (alkali metal or ammonium stannate, zincate, gallate, indate, plumbate, mercurate);
(3) "peak event" or modified passivation layer occurrence.

With respect to the third condition above—the inventors have found that in order for the modified passivation layer to occur (provided that conditions #1 and #2 are present), three parameters should be in proper combination:
a) Oxoanion additive(s) concentration;
b) Electrolyte temperature;
c) Anode potential versus electrolyte (current density).

Different combinations may result in a different passivation layer properties.

For example, as demonstrated in FIG. 3, the following values of the parameters: Anodic Alloy, electrolyte 30%(w/w) KOH solution with 0.004 M sodium stannate, electrolyte temperature 39° C., and current density 2.0 mA/cm$^2$ (which results in anode potential 1.76V versus Hg/HgO reference electrode), will result in a peak event and a modified passivation layer formation thereafter.

As described above, a certain combination of operational parameters is needed in order to initiate the modified passivation layer formation. Even with the proper anode material (such as Anodic Alloy), and a proper electrolyte solution (alkali metal or ammonium oxoanion salt-containing), a "peak event" may not happen during the battery operation cycle if both the operation temperature and the anode potential (current density) are not at the appropriate conditions. Accordingly, inducing the "peak event", and forming the modified passivation layer as early as possible in the battery operation cycle, is found to be beneficial in order to extract the maximum available energy and power.

A method of Al battery operation is proposed, that allows the initiation of the modified passivation layer formation at the beginning of a battery operation cycle, thus improving the overall battery performance. A method for initializing the modified passivation layer formation may comprise stages as follows:
(1) Al-air battery is heated up to the initial working temperature (usually above 40° C.), under operational current (typically 80-250 mA/cm$^2$);
(2) The applied/drawn current is momentarily decreased to a value between 0 . . . 50 mA/cm$^2$ or forced in the opposite (cathodic) direction in the range between −50 . . . 0 mA/cm$^2$ thus causing a peak of the anode potential to the values ranging −1.6 V to −2.2 V (versus Hg/HgO reference);
(3) The potential peak induces a reaction between the anode alloy and the oxoanion additive in the electrolyte. This reaction is observed as a fast increase followed by a decrease in H$_2$ evolution;
(4) After H$_2$ evolution stabilizes to a lower flow rate (up to 120 seconds), the operational current is re-applied and the battery operation continues.

Figure 6A:
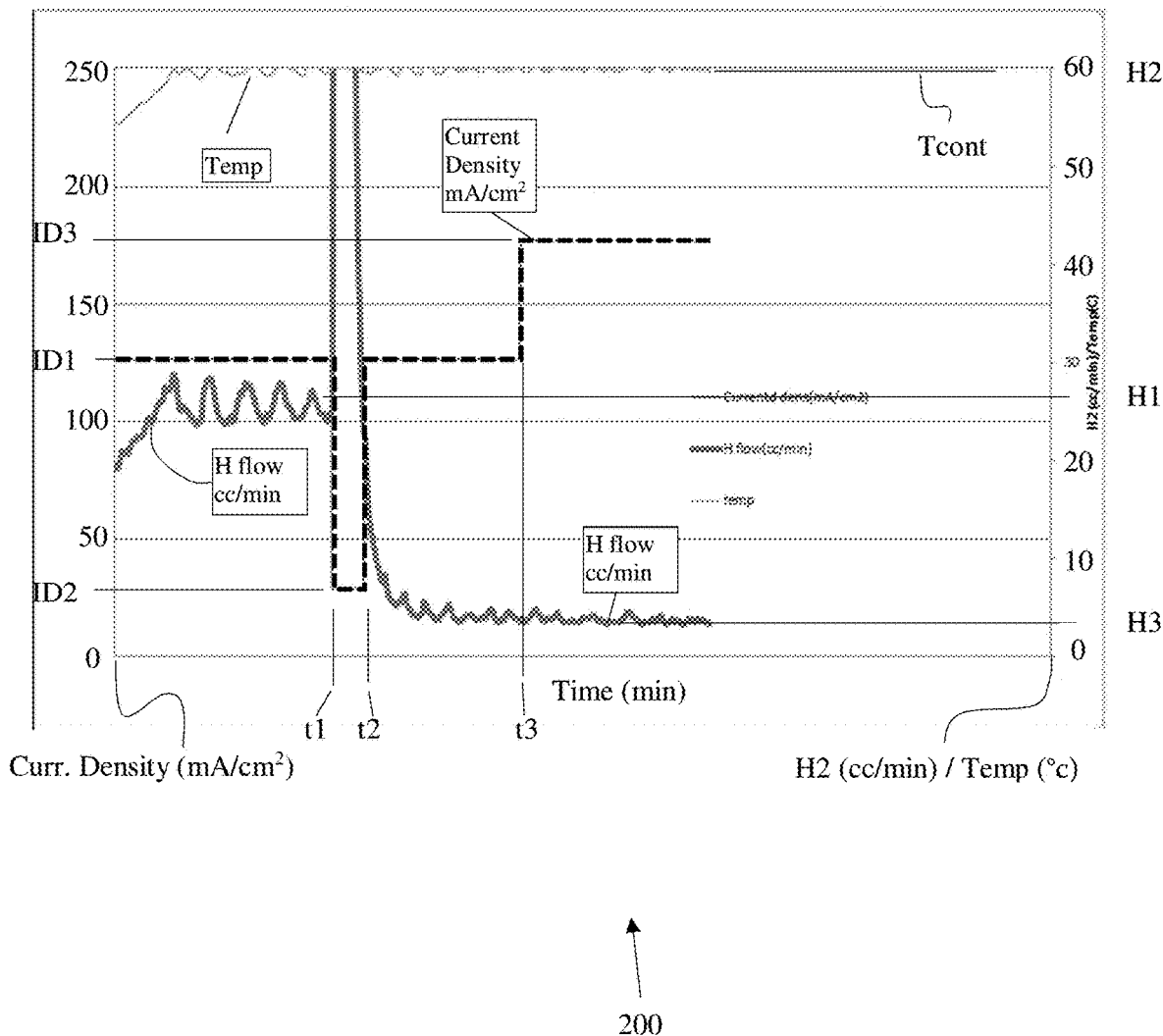
FIG. 6a depicts a graph of "Peak event" initiated in a system including Anodic Alloy and electrolyte KOH 30% (w/w) with 0.004M sodium stannate (half-cell) resulting in modified passivation according to embodiments of the present invention.
Figure 6B:
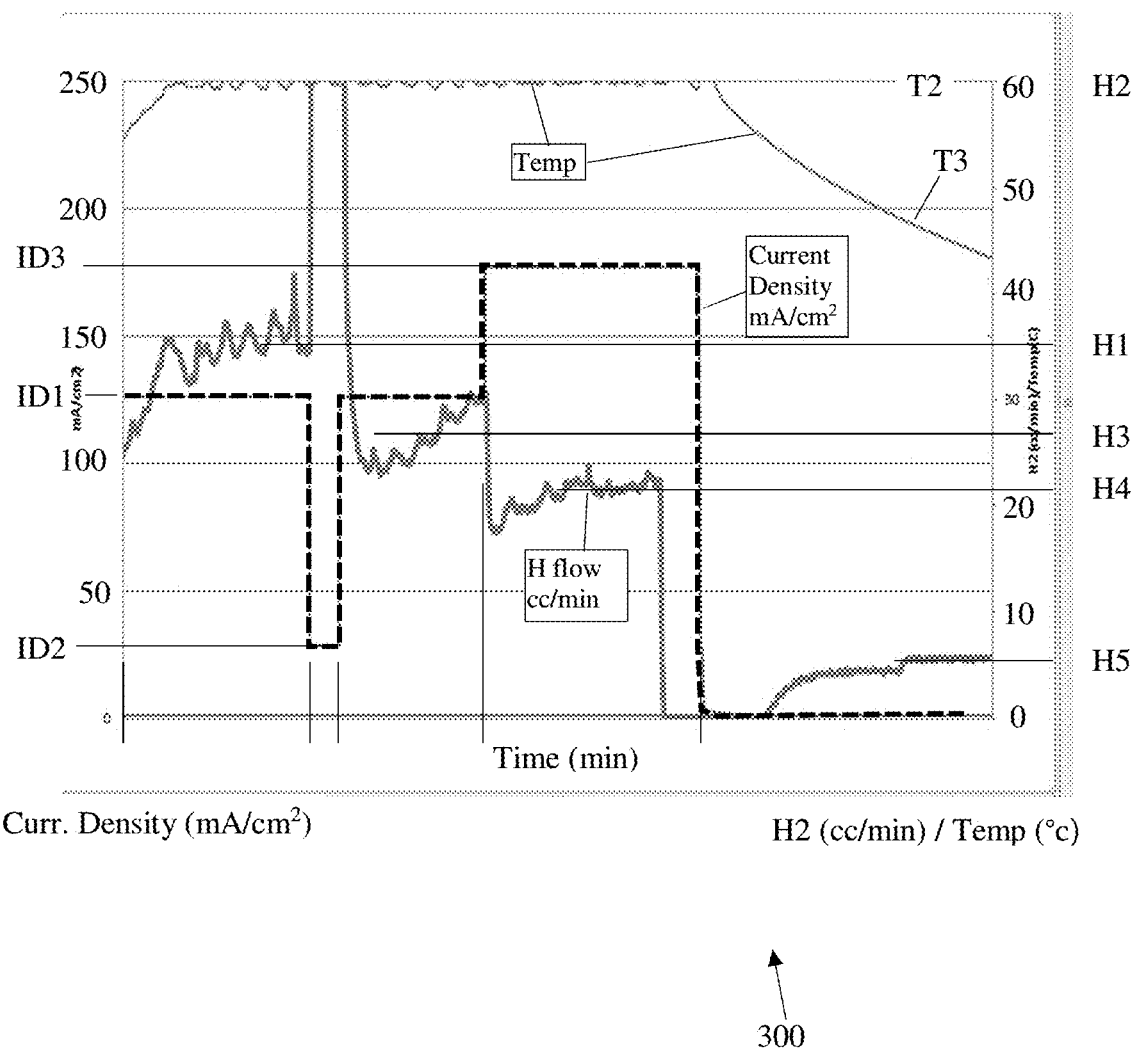
FIG. 6b depicts a graph of the behavior of regular 99.99% Al—Mg alloy in the conditions of the experiment as of FIG. 6a, according to embodiments of the present invention.

An example of this approach is illustrated by FIG. 6a. FIG. 6a depicts a graph 200 of "Peak event" initiated in a system including Anodic Alloy and electrolyte KOH 30% (w/w) with 0.004M sodium stannate (half-cell) resulting in modified passivation according to embodiments of the present invention; and FIG. 6b depicts a graph 300 of the behavior of regular 99.99% Al—Mg alloy in the conditions of the experiment as of FIG. 6a, according to embodiments of the present invention. FIG. 6a depicts a plot 200 of the corrosion rate for the Anodic Alloy anode in a stannate-containing electrolyte at a constant temperature and current density. At a certain moment of the experiment (marked "t1" on the timeline) a "potential peak" is applied on the anode. Within a short period of time, the applied current (or the drawn current, when operating a cell that provides current) drops (area between "t1" and "t2"). After the "potential peak" is accomplished and the previous current value is restored, the corrosion rate stabilizes to a significantly lower level compared to the corrosion rate before the "potential peak". Clearly, the potential peak and passivation "event" results in an irreversible change of the anode surface. However, the anode working conditions in the time intervals before "t1" and after "t2" are identical (same values of temperature, electrolyte, and applied current), The anode coated by modified passivation layer (after "t2") shows low corrosion, and increased overall performance.

Furthermore, the H$_2$ evolution rate after the "peak" becomes less sensitive to the magnitude of the current, as seen from the comparison of H$_2$ evolution rate reaction to the change of the applied current changing from ID1 to ID3 (compare the H$_2$ level of passivated anode of FIG. 6a and the H$_2$ of regular anode of FIG. 6b).

Contrarily, under the same test conditions, if the stannate additive is not present in the electrolyte for the same Anodic Alloy anode, the specimen does not undergo an irreversible change after the "potential peak" occurs. FIG. 6b shows that the H$_2$ evolution rate, after the potential peak (after "t2" mark on FIG. 6b H2 graph), tends to return to the same level prior to the "potential peak" (before "t1").

Figure 7:
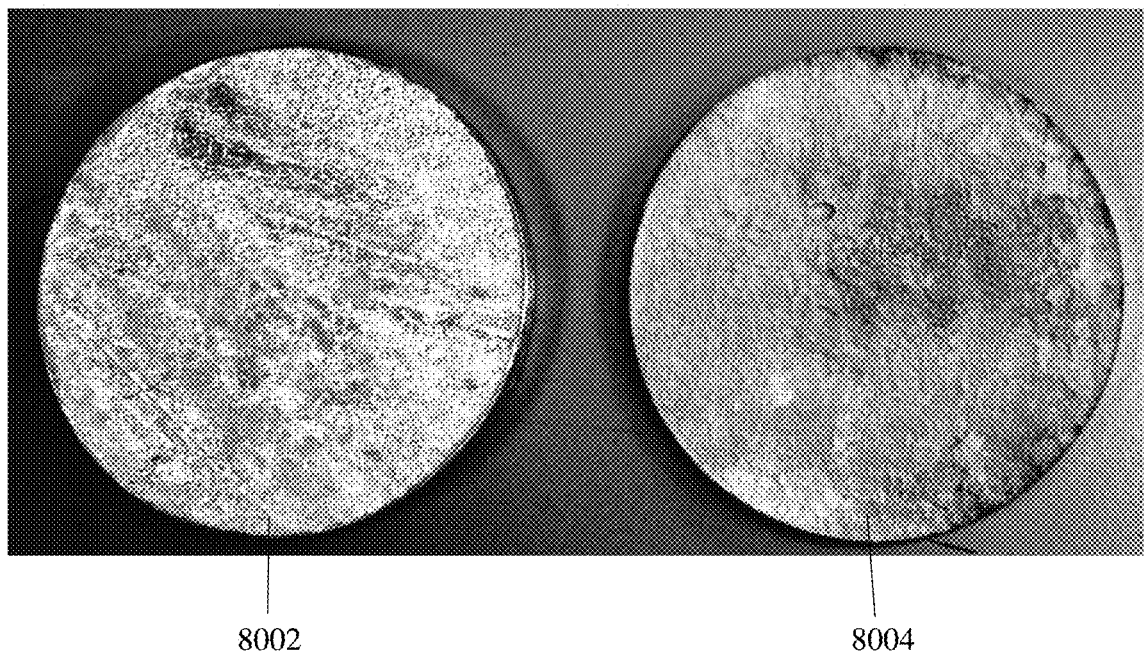
FIG. 7 depicts the working surface appearance of Anodic Alloy before (left) and after (right) the "peak event" resulting in modified passivation layer, according to embodiments of the present invention.

Thus concluding, that the irreversible change in the behavior of the Anodic Alloy is a result of a "peak event" occurrence, which causes a morphology change to the passivation layer on the anode surface. This conclusion is also supported by the visually observable changes of the anode surface appearance before and after "peak event". FIG. 7 depicts the working surface appearance of Anodic Alloy before (left, 8002) and after (right, 8004) the "peak event" resulting in modified passivation layer, according to embodiments of the present invention. As it seen on the FIG. 7, the working surface of Anodic Alloy before the "peak event" looks metallic shiny, while after the "peak" it becomes grayish and dull. This was subsequently determined to be due to tin particles deposited on the surface.

Figure 8:
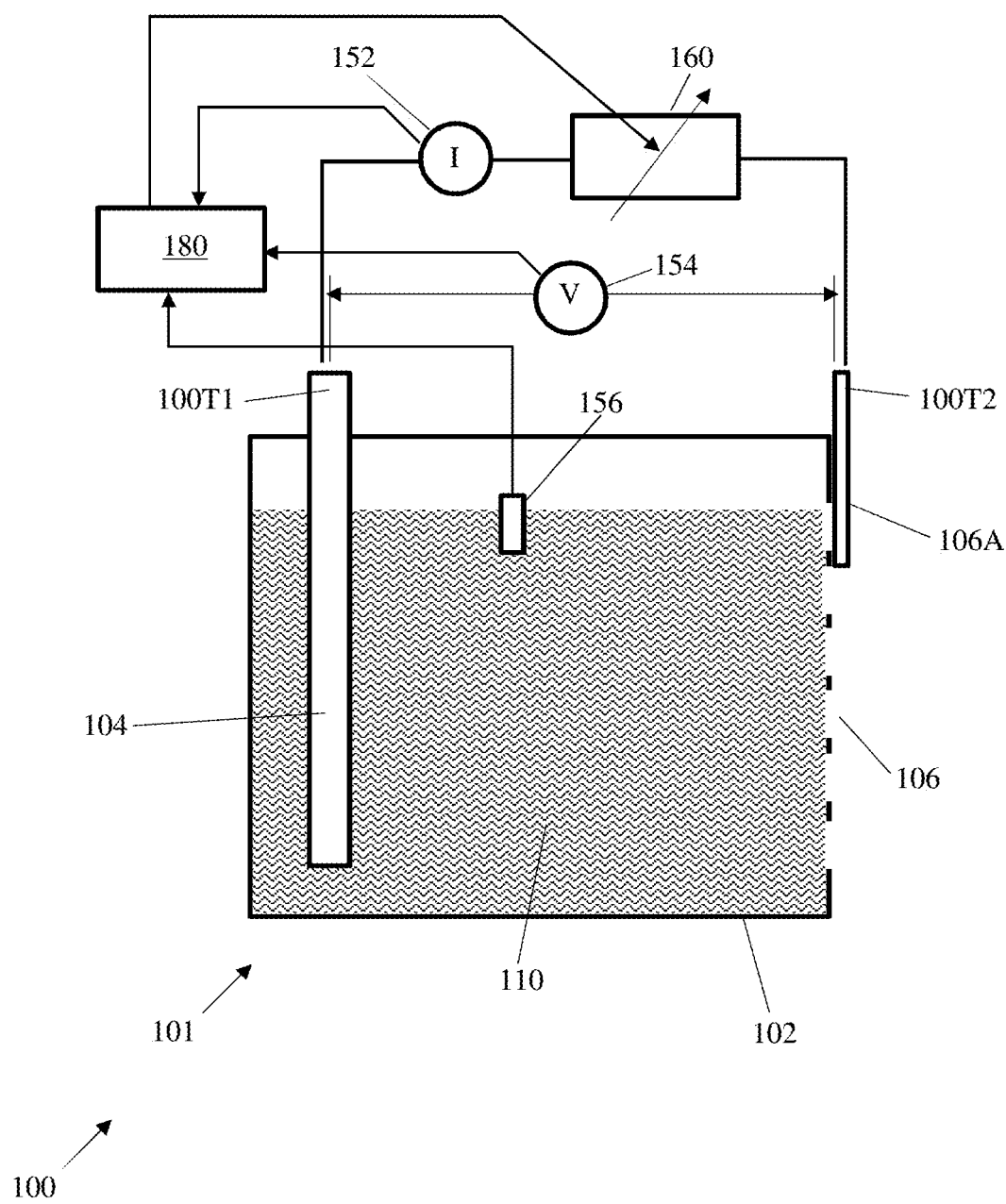
FIG. 8 depicts a block diagram of Al-air battery system, according to embodiments of the present invention.

Reference is made now to FIG. 8, which is schematic block diagram of metal-air cell system 100, according to embodiments of the present invention. Cell system 100 comprising of cell 101. Cell 101 a cell container 102, cell anode 104, cell cathode 106 and electrolyte 110. Cell 101 further includes anode terminal 100T1 and cathode terminal 100T2 at which electrical circuitry or load 160 may be connected. Cell system 100 may further comprise of voltage meter 154 that may be connected between cell terminals 100T1 and 100T2 to measure the voltage between the terminals and to provide an indication of the measured voltage. Cell system 100 may further comprise of current meter 152, which may be connected in series with one of the cell terminals and the load 160 to measure and provide indication of the measured current flowing between the cell terminals.

Load 160 may be an adjustable load, that may be controlled by a controller, to set the load's current as desired between current limits $I_{MIN}$ and $I_{MAX}$.

Cell system 100 may further comprise of controller unit 180 that may receive the indication of the cell voltage from voltage meter 154 and of the cell current from current meter 152. Controller unit 180 may further be connected to load 160 and adapted to adjust the load's current value, thereby adjusting the cell's current. Controller unit 180 may further be adapted to connect and disconnect the load's connections to/from cell 101 (controlled connections are not shown in the drawing) as is known in the art. Controller unit 180 may be any suitable controller, such as microcontroller programmable logic controller (PLC) system-on-chip unit, and the like, as is known in the art. Controller unit may comprise memory unit, Input/Output (I/O) unit, CPU and the like, so as to enable performance of program steps of a program stored in the memory unit so as to carry out steps and methods described in this application. Controller unit 180 may further comprise user interface to allow loading/updating/changing stored program code and/or stored data.

Cell system 100 may further comprise sensor 156 adapted to provide indication of at least one feature of the operation of cell system 100 from the following features: alkali concentration, electrolyte pH, electrolyte temperature, rate of $H_2$ production and $H_2$ flow meter in cell system 100. The one or more indications may be provided to controller unit 180.

As disclosed here, the modification of the passivation layer may be initiated by controlling the operational parameters of the battery and thereby improve the performance of the Al-air battery.

Figure 9A:
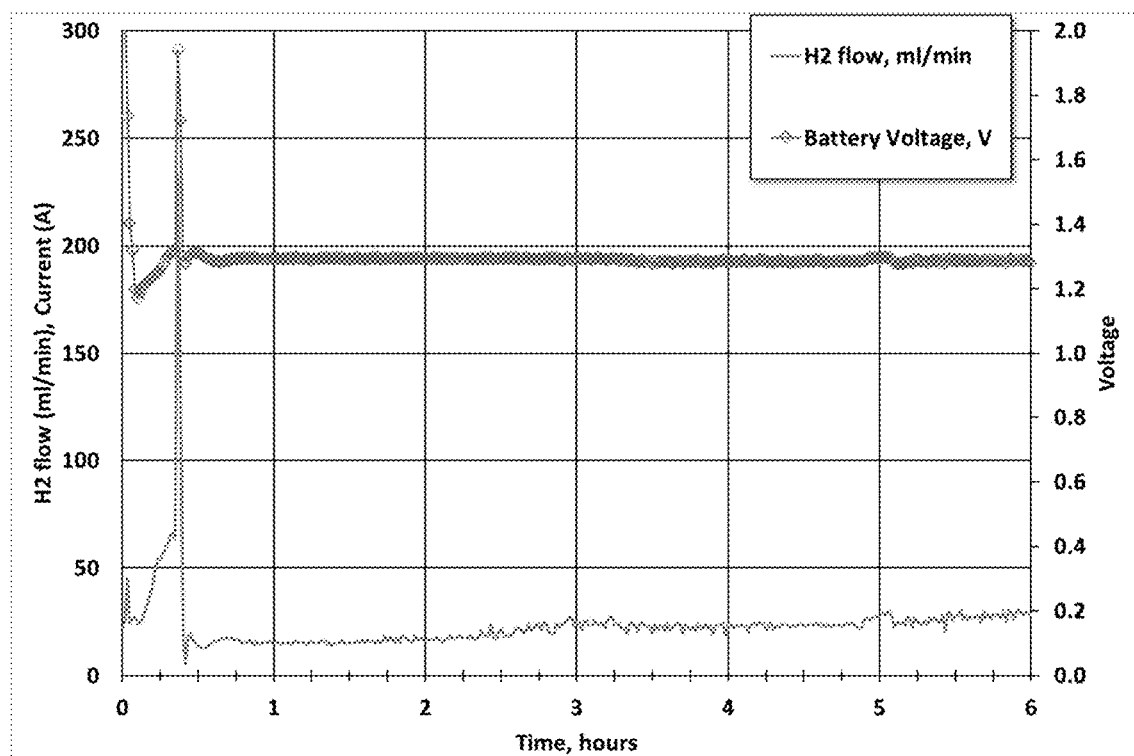
FIG. 9a is an example of "peak event" initiation in a practical battery (the Al-air battery of FIG. 1 with Anodic Alloy) showing Voltage and Hydrogen evolution rate, according to embodiments of the present invention.

An example of how the technique of anode performance improvement by controlling the battery operational parameters values, to result in modification of the passivation layer is implemented in an Al-air battery operation is shown in FIG. 9a. The graph shows the profiles of voltage and $H_2$ evolution rate of an Al-air battery (anode made of Anodic Alloy, electrode area 400 cm², Phinergy Ltd. air cathode, circulating KOH electrolyte with 0.004 M of sodium stannate), according to embodiments of the present invention. Furthermore, the graph shows the battery voltage and $H_2$ evolution during a battery operation lasting 6 hours at stable performance conditions. Overlapping peaks of voltage and $H_2$ evolution are seen between time marks 0.25 and 0.5 hours on the time axis. In order to better display this observation, a blown-up insert of this time interval is shown in FIG. 9b.

Figure 9B:
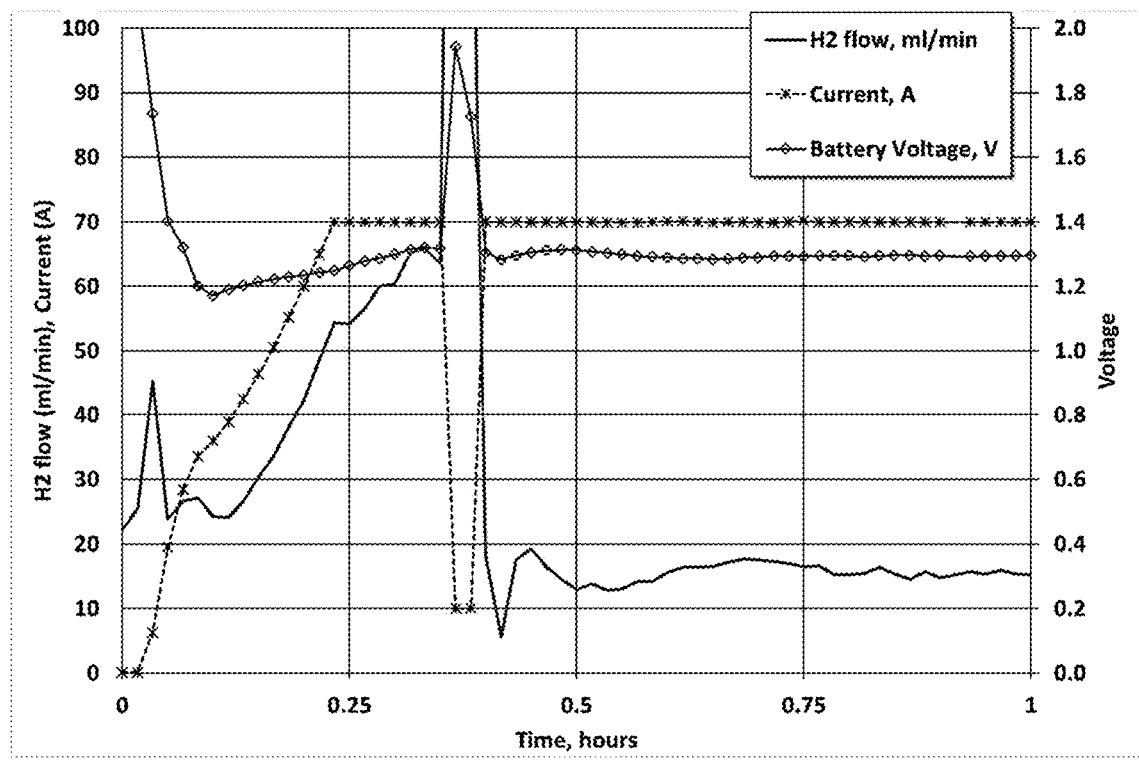
FIG. 9b is a blow-up graph of the zone of initiated "peak event", as on FIG. 10a, according to embodiments of the present invention.

As displayed in FIG. 9b, after the process begins (battery start), and a gradual heat-up, the target value of the operational current 70 A (which corresponds to 175 mA/cm²), and stable voltage of ~1.3V per single cell was reached in approximately 0.3 hours. At this time, the $H_2$ evolution rate (which is the indication of the corrosion rate and parasitic anode material loss) was also stabilized at the total value of circa 65 mL/min. At the time interval between 0.3 and 0.4 hours, the operational current was abruptly dropped from 70 A to 10 A. Thus, immediately causing a voltage peak up to 1.6V (anode potential peak, measured versus battery air cathode). Promptly afterwards, the $H_2$ evolution rate quickly increased to circa 230 mL/min, and immediately dropped down because of modified passivation layer formation on the anode. After restoring the applied current to 70A, the new $H_2$ evolution rate is stabilized to below 20 mL/min, thus indicating that the modified passivation layer has formed and attributed to a 3-fold decrease in $H_2$ evolution. As previously seen in FIG. 9a, this newly created modified passivation layer provides an improved anode and battery performance during the remaining six hours of battery operation, despite continuous Al consumption throughout the process. It is evident that once the modified passivation layer was formed the effect and benefits of it, as may be measured by the $H_2$ evolution rate, remain as the anode consumption continues.

Figure 10:
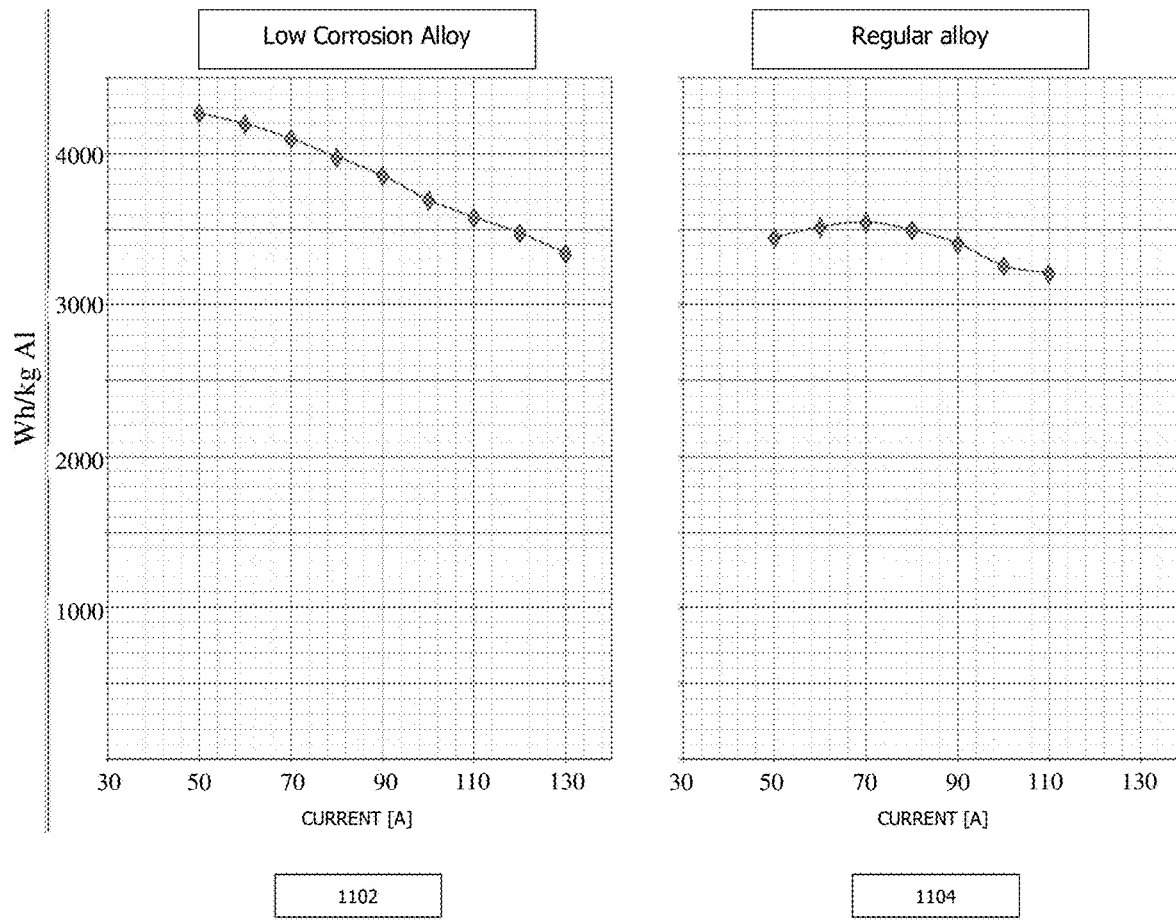
FIG. 10 shows a comparison of energy utilization in an Aluminum anode of the Al-air battery of FIG. 1 with an Anodic Alloy compared (graph 1102) with the same cell using anode of Aluminum (graph 1104), according to embodiments of the present invention.

As previously discussed, the most comprehensive criterion that describes the anode performance in an Al-air battery is the "energy utilization" figure (eq. 7), expressed in Wh/kg, showing the Watt-hours of useful electric energy that may be obtained from 1 kg of consumed anode material. FIG. 10 shows the comparison of energy utilization practically measured in an Al-air battery with Anodic Alloy (graph 1102) anode, and with "regular" alloy (Al—Mg) (graph 1104), at the same test conditions. Anodic Alloy was subjected to prior "passivation event" before the test, while "regular alloy" does not form the modified passivation layer at the same conditions, even when is subjected to "passivation event". Energy utilization that is practically obtained from such pre-treated Anodic Alloy is substantially higher than that obtainable from the "regular" alloy.

Figure 11:
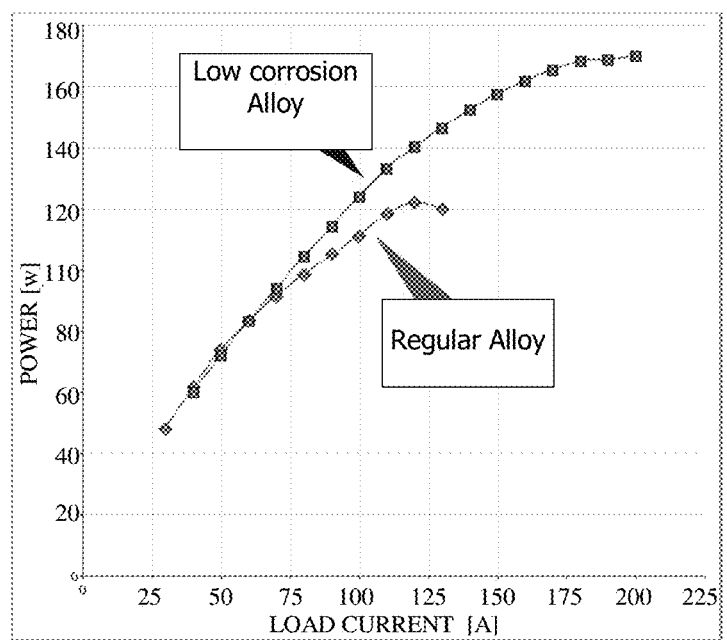
FIG. 11 depicts graphs of Power-Current response, comparison of Anodic Alloy anode and of anode of Al—Mg alloy (2.5% Mg, 99.99% purity), electrolyte 30% (w/w) KOH with 0.004M sodium stannate, according to embodiments of the present invention.

Modification of the passivation layer, as described herein, results in a lower corrosion rate, higher energy utilization, and improved maximum available power. As seen in the FIG. 11, a cell consisting of a Anodic Alloy anode that has undergone a "passivation event" allows for a power output up to 170 W/cell, while a "regular" Al—Mg alloy of similar composition is challenged to produce sustainable power above 130 W/cell (Phinergy Al-air battery, 400 cm² electrode area).

Figure 12:
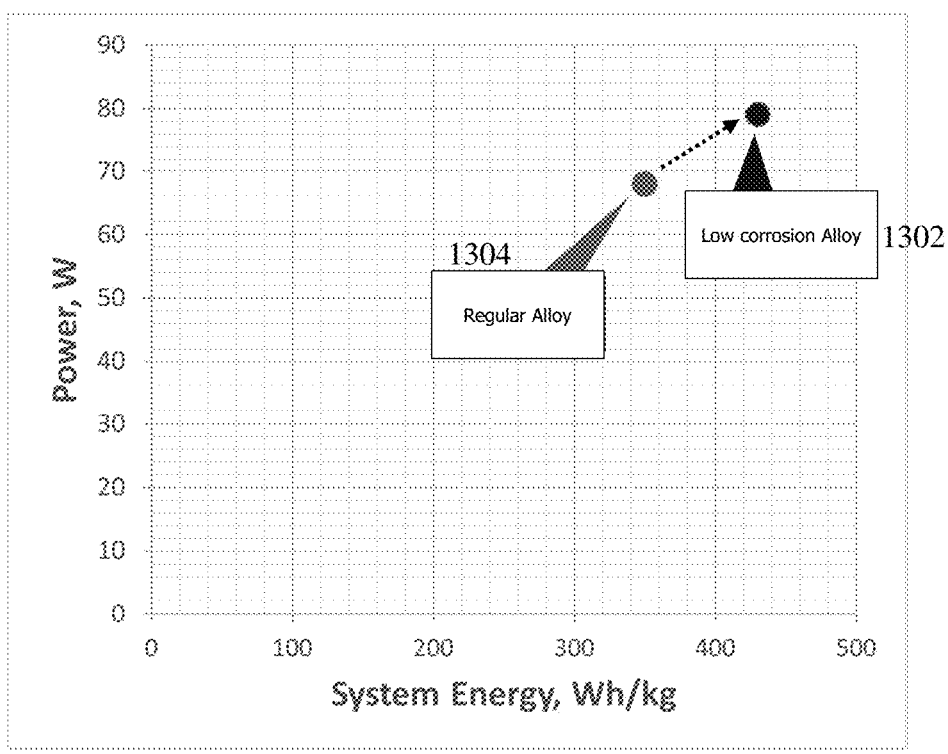
FIG. 12 depicts a graph of average power per cell in Al-air battery system with Anodic Alloy anode (denoted 1302) compared to the same Al-air battery with anode of Al—Mg alloy (2.5% Mg, 99.99% purity) (denoted 1304), electrolyte 30%(w/w) KOH with 0.004M sodium stannate.

FIG. 12 depicts a graph of average power per cell (Phinergy Al-air battery described above, 400 cm² electrode area), and "system energy density", which is the energy produced by system that is normalized by system weight, including electrolyte that was consumed during the experiment. While, the "regular" anode reaches circa 350 Wh/kg, Anodic Alloy, passivated according to this invention, improves system energy density up to above 420 Wh/kg under cell conditions that have been previously detailed.

While certain features of the invention have been illustrated and described herein, many modifications, substitutions, changes, and equivalents will now occur to those of ordinary skill in the art. Therefore, the appended claims are intended to cover all such modifications and changes as fall within the true spirit of the invention.

The invention claimed is:

1. A method of creating a passivation layer on an Anodic Alloy anode in an Al-air cell, the method comprising:

providing to the Al-air cell electrolyte comprising alkali or ammonium oxoanion salt additive at a given concentration;

controlling the operational conditions of the Al-air cell to a specific point, that comprises controlling a specific temperature of the electrolyte and a specific current density drawn from the anode; wherein the specific current density drawn from the anode influences a specific negative potential of the anode with respect to the electrolyte, when the operational condition parameters stabilize— decreasing the drawn electrical current density from the Al-air cell to a first low current density thereby causing momentary lowering of the anode potential below a first negative potential value and a momentary rise of evolution rate of $H_2$ from the electrolyte followed, after a first period of time, by sharp drop of the $H_2$ evolution rate; and when the level of $H_2$ evolution stabilizes at low values and no later than a second period of time from the time the level of $H_2$ evolution rate lowered, drawing from the Al-air cell operational current.

2. The method of claim 1 wherein the concentration of the alkali or ammonium oxoanion salt additive is 0.001-0.1M.

3. The method of claim 2 wherein the alkali or ammonium oxoanion salt additive is at least one of stannate, zincate, indate, gallate, plumbate and mercurate.

4. The method of claim 2 wherein the temperature of the electrolyte at stabilized operational conditions is less than 50° C. and is between 50° C. and 65° C. during the momentary time of rise of the $H_2$ evolution.

5. The method of claim 1 wherein the first negative potential of the anode is −1.6V or less with respect to the electrolyte.

6. The method of claim 5, wherein the first low current density is in the range of −50 to 50 mA/cm$^2$.

7. The method of claim 1 wherein the first period of time is in the range of 1-120 seconds.

8. The method of claim 1, wherein the momentary lowering of the anode potential below a first negative voltage is performed using an external electrical power source.

9. The method of claim 1, wherein the momentary lowering of the anode potential begins within the first 10% of total expected duration of the Al-air battery operation cycle.

10. The method of claim 2 wherein the temperature of the electrolyte during the momentary time of rise of the $H_2$ evolution is between 50° C. and 65° C.

* * * * *